Jan. 6, 1942.                P. DOUGLAS                2,268,575
                              LUBRICATION
                            Filed June 7, 1938
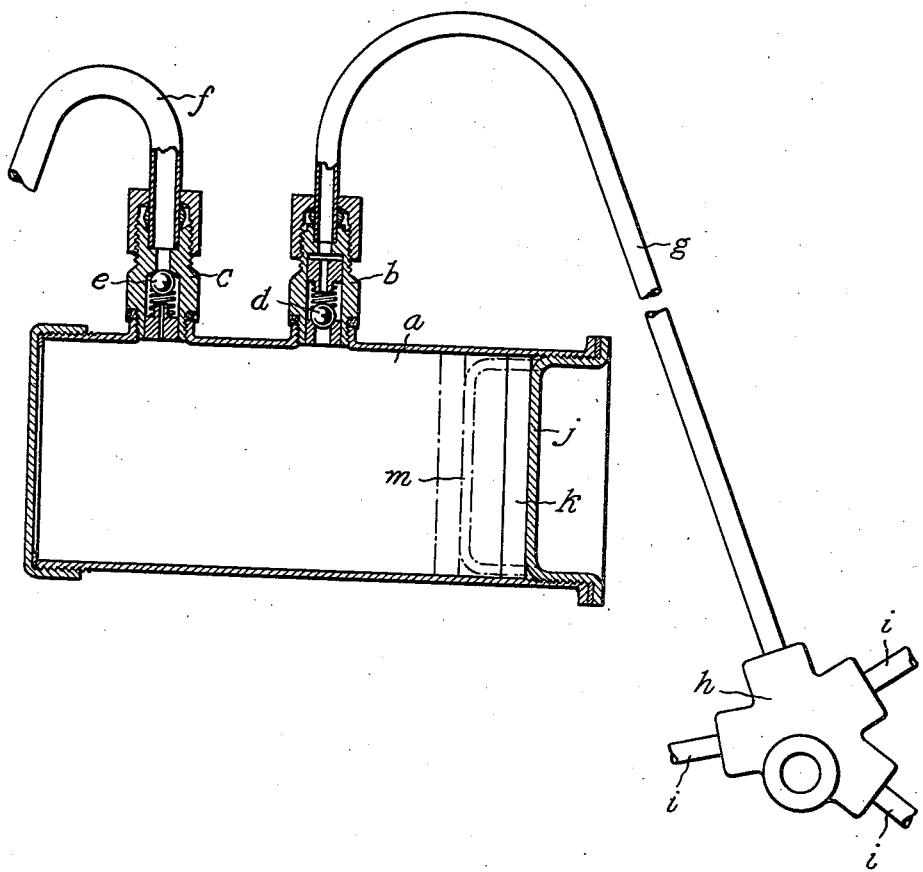
INVENTOR
*Percy Douglas*
BY
*Dean Fairbank & Hersh*
  415  ATTORNEYS Patented Jan. 6, 1942

2,268,575

UNITED STATES PATENT OFFICE 2,268,575

LUBRICATION

Percy Douglas, Birmingham, England, assignor to Auto Research Corporation, a corporation of Delaware Application June 7, 1938, Serial No. 212,227
In Great Britain June 15, 1937

1 Claim. (Cl. 184—6)

This invention has for its object to provide improved means for effecting automatic intermittent lubrication of various parts of a mechanically propelled vehicle, such as the road wheel mountings, spring shackle pins, and spindle associated with the brake mechanism.

The invention comprises the combination of a closed vessel adapted to be filled with lubricating oil and to receive heat from any convenient part such as the engine exhaust manifold or the jacket water system, and oil inlet and outlet connections each having a non-return valve, the outlet connection, or at least one outlet connection, being arranged at the part of the vessel which is highest when in use. Also the invention comprises a closed vessel of adjustable capacity.

The accompanying drawing is a sectional elevation of lubricating means constructed in accordance with the invention.

In carrying the invention into effect as shown I employ a cylindrical vessel $a$ of any convenient capacity, the latter being determined by the amount of oil to be displaced from it by expansion over a given range of temperature variation. This vessel $a$ is itself comparatively rigid in the sense that the amount of its expansion relatively to that of the oil contained within it is small. Also the vessel $a$ is adapted to be mounted on or adjacent to a hot body (not shown) so that it can receive heat freely from the said body. For example, the vessel may be adapted to be mounted on and in good thermal contact with the engine exhaust manifold of a mechanically propelled vehicle, or with a hot part of the jacket water system of the vehicle.

On the side of the vessel $a$ which is uppermost when in use is arranged the outlet connection $b$, or both this connection and the inlet connection $c$, these connections being fitted respectively with non-return valves $d$, $e$ in the form of spring loaded balls. The inlet connection $c$ communicates by a pipe $f$ with a lubricating oil storage tank (not shown), or with any other convenient source of supply such as the engine crank case. The outlet connection $b$ communicates by a pipe $g$ with a distributor $h$ from which separate distributing pipes $i$ are taken to the points to be lubricated, the amount of oil supplied to each point being controlled by any convenient metering device. Alternatively the vessel may be provided with a plurality of outlet connections each adapted for the attachment to it of a distributing pipe, but usually the first described arrangement is more convenient. But when two or more outlet connections are used, at least one of them is situated on the part of the vessel which is uppermost when in use, to permit the escape of air entrapped in the vessel.

When cold the vessel $a$ is full of oil. Due to the heat received when the engine is in operation the oil expands and some of it passes through the outlet connection $b$ (or connections) to the various points to be lubricated. On cooling after the engine has been stopped the vessel $a$ is replenished by suction through the inlet connection $c$.

The amount of oil displaced from the vessel $a$ at each operation depends on the range of temperature through which the vessel has been heated and on the capacity of the vessel. To enable the displacement to be varied provision may be made for enabling the vessel to be moved closer to or further away from the body from which it receives its heat. Or provision may be made for varying the capacity of the vessel. Preferably I make the vessel $a$ open at one end, and into or over this end I screw a plug or cap $j$ which may be conveniently provided on its inner side with a disc $k$ adapted to fit tightly within the vessel. The capacity of the vessel can be changed either by screwing the plug or cap $j$ relatively to the main part of the vessel, or by replacing the plug or cap by another of different size or shape, such as that shown in broken lines and indicated by $m$, which gives the required change in volume. Alternatively the vessel may be formed by two telescopic parts adjustably secured together.

By means of this invention I am able to effect automatic intermittent lubrication of parts of a motor vehicle in a very simple and satisfactory manner.

The element shown upon the attached drawing may be most conveniently utilized with a lubricating system of the type shown and illustrated in Patents 1,632,771, 1,632,772, 1,732,212, 1,975,920 and 2,017,848.

The invention, however, is not intended to be restricted to any particular construction or arrangement of parts, or to any particular application of any such construction, or to any specific method of operation, or manner of use, or to be any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

What is claimed is:

A centralized lubricating installation for installation upon mechanically propelled vehicles provided with engine exhaust manifolds and water jacket systems and also upon other mechanisms having parts of elevated temperature, said installation comprising a central source of lubricant pressure and supply mounted in heat exchange relationship with respect to said part of elevated temperature, said source including a cylindrical closed vessel, the axis of which is positioned horizontally filled with lubricating oil of adjustable capacity, the vessel being provided at one end with a replaceable cup shaped screw cap for controlling the capacity of the vessel, said screw cap constituting a telescopic part, and the bottom of said cup being designed to be positioned substantially inside of the vessel to form an end for said vessel, and a disk resting against the bottom of said cup and tightly fitting within said vessel, and said vessel being provided with oil inlet and outlet connections, each having a non-return valve, the inlet and outlet connections being connected to the part of the vessel which is highest when in use, and a branched distributing tubing system connected to said outlet connection.

PERCY DOUGLAS.